United States Patent [19]
Metcalf

[11] 3,869,601
[45] Mar. 4, 1975

[54] COMPUTING APPARATUS FOR TRACKING MOVING OBJECTS

[75] Inventor: Eric Metcalf, Ropley, England

[73] Assignee: The Solartron Electronic Group Limited, Hampshire, England

[22] Filed: June 20, 1973

[21] Appl. No.: 371,644

[30] Foreign Application Priority Data
June 21, 1972 Great Britain.................... 29007/72

[52] U.S. Cl. ........ 235/150.2, 235/150.26, 343/5 DP
[51] Int. Cl. .......................................... G06f 15/50
[58] Field of Search....... 235/150.2, 150.26, 150.27, 235/181, 186, 189; 343/100 R, 100 CS, 112 C, 112 CA, 112 R, 5 DP; 340/347 SY

[56] References Cited
UNITED STATES PATENTS

| | | | |
|---|---|---|---|
| 3,064,250 | 11/1962 | Close | 343/7.3 |
| 3,350,548 | 10/1967 | Whitaker | 235/150.2 X |
| 3,368,217 | 2/1968 | Musso | 343/5 |
| 3,383,677 | 5/1968 | Baum et al. | 343/5 |
| 3,641,565 | 2/1972 | Ivers et al. | 340/347 Sy |
| 3,727,218 | 4/1973 | Cantwell, Jr. et al. | 343/5 DP |
| 3,749,893 | 7/1973 | Hileman | 235/189 X |

FOREIGN PATENTS OR APPLICATIONS
1,140,318  1/1969  Great Britain
1,164,056  9/1969  Great Britain

Primary Examiner—Joseph F. Ruggiero
Attorney, Agent, or Firm—Roylance, Abrams, Berdo & Kaul

[57] ABSTRACT

The specification describes computing apparatus adapted for use with marine radar on a ship to track the movements of other ships. The computing apparatus comprises means for periodically converting the radar signals into xy positional signals in cartesian coordinate form, and means for storing these positional signals. The stored positional signals are then applied to a digital filter, which is effectively operative to determine a third order polynomial function which is a least squares fit with the positional signals, thereby substantially reducing the error associated with each positional signal. The digital filter then produces output signals representative of the course and speed of each of the other ships at the time represented by the most recent positional signals.

The output signals produced by the digital filter are then used to predict the future tracks of each of the other ships, and to calculate the time and distance of closest approach of each of the other ships, thereby facilitating collision avoidance procedures.

28 Claims, 6 Drawing Figures

COMPUTING APPARATUS FOR TRACKING MOVING OBJECTS

This invention relates to computing apparatus for tracking moving objects, and is more particularly but not exclusively concerned with computing apparatus for use on a ship, in conjunction with radar apparatus carried by the ship, for tracking the movements of other ships.

As sea lanes become more crowded, it is becoming increasingly important that those directing a ship should receive accurate and up-to-date information concerning the bearings, courses and speeds of other ships in the vicinity of their own ship. In particular, it is desirable that changes in the courses of the other ships should be detected as soon after they commence as possible, so that appropriate avoiding action, if necessary, can also be initiated as soon as possible. Conventionally, this information is derived from radar apparatus, which periodically produces positional signals indicative of the instantaneous positions of the other ships. The positions are then plotted manually on a chart, or the positional signals are stored on magnetic tape and subsequently displayed simultaneously as a succession of positions on a cathode ray tube of the radar apparatus: in both cases, representations of the other ships' past tracks are obtained, which representations can be periodically updated.

However, because of inherent inaccuracies in the positional signals from the radar apparatus, the estimation of the course and speed of one of the other ships from, say, its last two recorded positions, i.e., the positions which should lead to the most up-to-date values of course and speed, is subject to very large inaccuracies. To obtain a more accurate estimate, it is therefore necessary to use a much larger number of recorded positions: but in some circumstances it can take up to 5 minutes before a change of course and/or speed of the other ships even becomes readily apparent from the representation of its past track, and time delays of this order can be quite hazardous in some situations.

It is an object of the present invention to provide computing apparatus for tracking moving objects, particularly ships, so as to determine the direction and speed of their movement relatively accurately and relatively quickly According, therefore, to one aspect of the present invention, computing apparatus for tracking moving objects comprises:

input circuit means for receiving temporally-spaced input positional signals each of which is indicative of a position of at least one moving object and may be subject to error;

means for producing from said input signals a plurality of temporally spaced pairs of digital positional signals $x$, $y$, each of which pairs of signals is representative in cartesian co-ordinate form of a position of said at least one object;

digital signal storage means connected to receive said pairs of signals and arranged to store a predetermined number of the most recently produced thereof;

digital filter means arranged to receive the stored signals, said digital filter means including digital multiplier means for multiplyiing each of said stored signals $x$ by a respective one of a first set of predetermined coefficients and each of said stored signals $y$ by a respective one of a second set of predetermined coefficients, and means for summing the products of $x$ thus formed and for summing the products of $y$ thus formed, so as to produce respective digital signals representative of the time derivatives $d^m x/dt^m$ and $d^m y/dt^m$ ($m = 0, 1, 2, \ldots$) at at least one preselected common point in time on respective hypothetical functions $x = f_1(t)$ and $y = f_2(t)$ which substantially fit the values represented by $x$ and $y$, both said hypothetical functions being either at least second order polynomial functions, or spline functions;

and means for producing output signals which are dependent upon said time derivative digital signals.

Thus said time derivative digital signals are representative of $x$ and $y$, and/or $dx/dt$ and $dy/dt$, and/or $d^2x/dt^2$ and $d^2y/dt^2$ and so on.

Advantageously, said predetermined coefficients are selected on the basis that said hypothetical functions are both third order polynomial functions, and are both preferably a least squares fit with the values represented by $x$ and $y$.

The invention will now be described, by way of non-limitative example only, with reference to the accompanying drawings, of which.

Figure 1A:
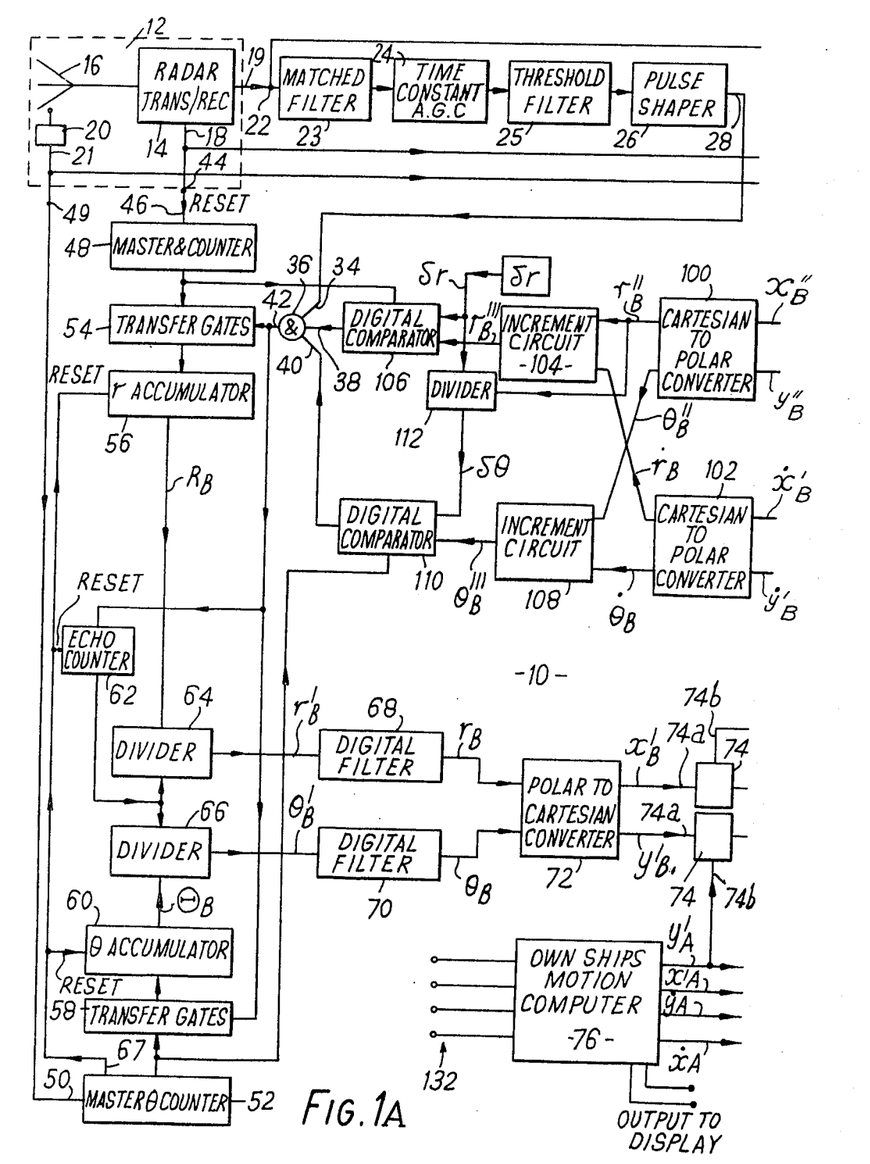
FIGS. 1A and 1B, taken together, constitute a simplified schematic block diagram of computing apparatus in accordance with the present invention, for use on a ship in conjunction with radar apparatus carried by the ship, for tracking the movements of other ships.
Figure 1B:
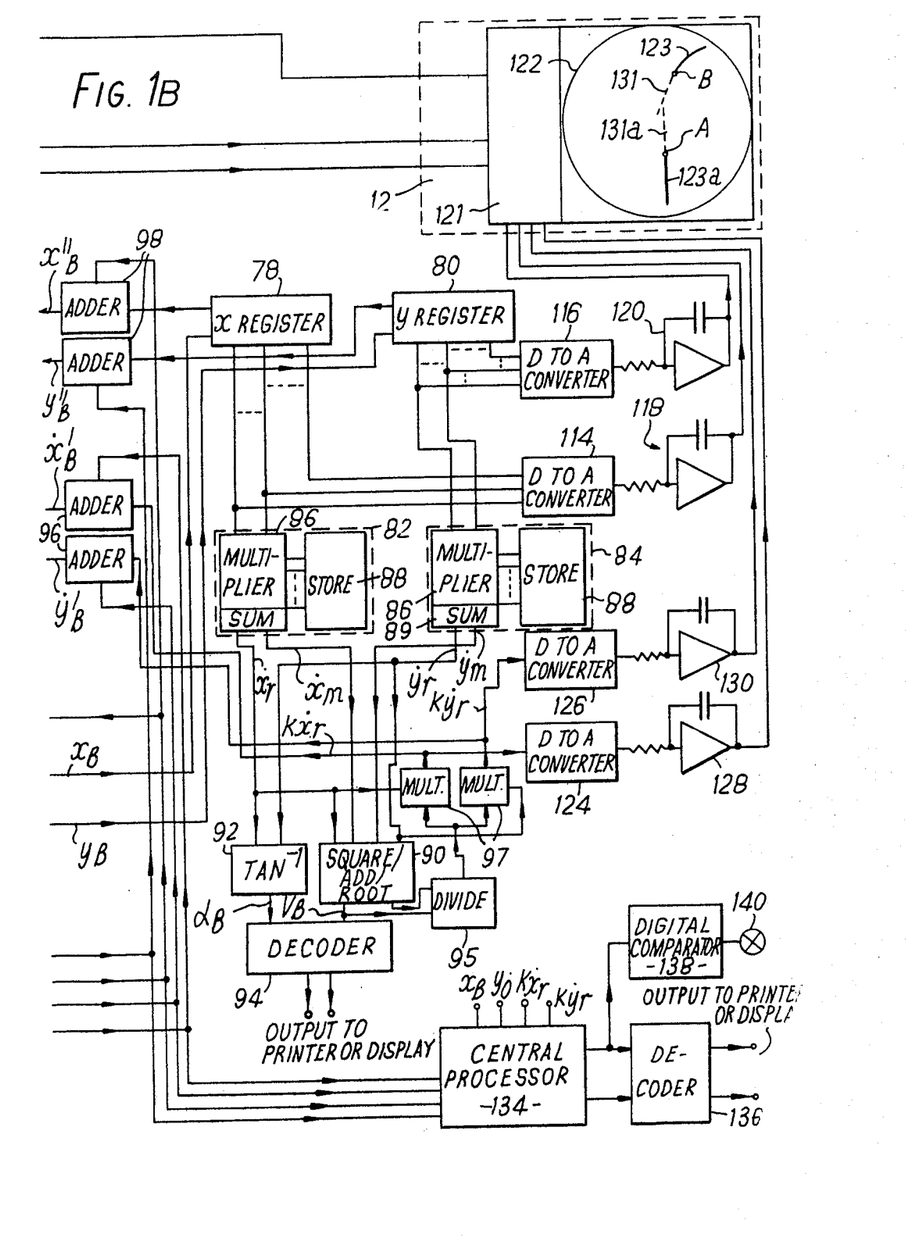

The computing apparatus shown in FIG. 1 is indicated generally at 10, and is shown connected to shipborne radar apparatus indicated generally at 12. The ship carrying the computing apparatus and radar apparatus 12 is indicated at A in FIG. 2. For clarity, the computing apparatus 10 has been simplified to show those parts thereof required for tracking the movement of only one other ship, which is indicated at B in FIG. 2. However, by suitably duplicating, and/or time-sharing the operation of, some of the parts, the movements of a large number of other ships can be tracked, as will hereinafter be described in more detail.

The radar apparatus 12 may be constituted by any one of many commercially available marine radar systems, for example the marine radar systems manufactured in the United Kingdom by Decca Limited under the names TRANSAR or SOLID STATE, and will therefore be only briefly described. Thus the radar apparatus 12 comprises a radar transmitter/receiver 14 which is arranged to supply pulsed radar output signals, typically every 3 milliseconds to a revolving radar aerial 16. The transmitter/receiver 14 also produces, at an output 18 thereof, synchronising signals known as "sync.pulses" coincident in time with each of the radar output signals. The aerial 16 transmits the radar output signals, and receives back reflected radar signals, or "echoes," which have been reflected from targets such as land masses and other ships, e.g., the ship B, in the vicinity of the ship A. The echoes are supplied to and detected in the transmitter/receiver 14, and the detected echoes appear as I.F. pulses at an output 19 thereof.

The aerial 16 revolves at substantially constant speed, typically one revolution every 3 seconds, and incorporates a correction unit 20 connected to the output of a gyro compass (not shown) carried by the ship A. The correction unit 20 has an output 21 at which it produces an index pulse for each increment, e.g., of a revolution of the aerial 16 with respect to true (gyro compass) north.

The echo pulses at the output 19 enter the computing apparatus 10 via an input 22 thereof, whence they pass via a matched filter 23 to a time constant automatic gain control circuit 24, whose gain periodically increases with time from the instance of each sync. pulse, to compensate for the reducing amplitude of echoes reflected from increasingly distant targets. The amplified echo pulses produced by the circuit 24 are therefore of very approximately uniform amplitude, and pass to a threshold filter 25 which rejects all echo pulses below a predetermined amplitude. If desired, the gain of the circuit 24 can be varied in other ways: for example, the circuit 24 may include means for monitoring the average amplitude of the background noise or "clutter" in the signal from the transmitter/receiver 14 over predetermined short time intervals, and means for adjusting the gain thereof to maintain this average amplitude substantially constant. Those echo pulses passed by the filter 25 are supplied to a pulse shaping circuit 26, which shapes them to produce at its output 28 corresponding echo pulses of substantially uniform amplitude and width.

It will be appreciated that the time interval between a sync. pulse indicative of a particular radar output signal, and the production at the output 28 of an echo pulse resulting from that radar output signal, is a measure of the distance from the ship A to the target responsible for the echo pulse. Thus the echo pulses, the sync. pulses and the index pulses constitute input positional signals from which the positions of targets can be deduced.

Figure 2:
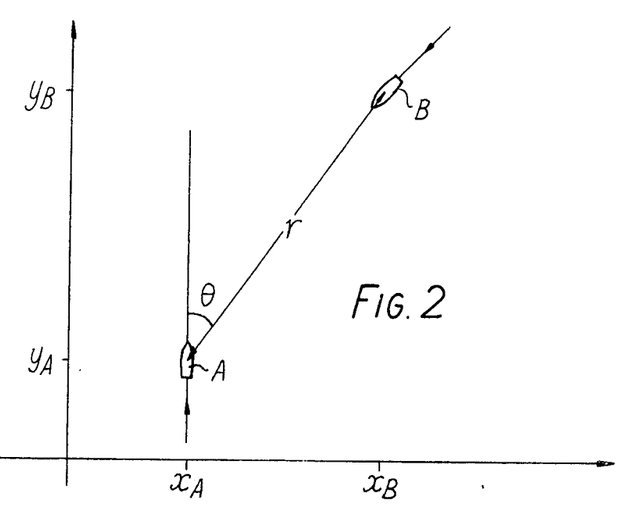
FIG. 2 is an explanatory diagram showing a ship fitted wtih the computing apparatus of FIG. 1, and another ship being tracked.

The echo pulses from the output 28 are applied to one input 34 of a three-input AND gate 36. The other two inputs 38 and 40 of the AND gate 36 are respectively connected to be energised for times which respectively define a small range of values of $r$ and a small range of values of $\theta$, where $r$ and $\theta$ are respectively the distance to the bearing of a target, as shown in FIG. 2. The generation of the energising signals for the inputs 38, 40 will be described in more detail hereinafter: their function is to define a small area, or "radar window," in the vicinity of the ship A, in which area only a particular target (i.e., the ship B) is expected to be found. Thus only echo pulses due to the ship B will appear at the output 42 of the AND gate 36.

The sync. pulses from the output 18 pass, via an input 44 of the computing apparatus 10, to reset input 46 of a counter/timer 48, hereinafter called the master-$r$ counter. Each sync. pulse thus resets the master-$r$ counter 48, which has a typical running frequency of 10 MHz, to zero. Similarly, the index pulses form the output 21 pass, via an input 49 of the computing apparatus 10, to a count input 50 of a counter 52, hereinafter called the master-$\theta$ counter, which has a full house count equal to the number of index pulses produced during one complete revolution of the aerial 16 with respect to true north. It will be appreciated, therefore, that the count in the master-$r$ counter 48 at any instant is a measure of the time elapsed since the most recent sync. pulse, i.e., since the most recent transmission of a radar output signal from the aerial 16, and the count in the master-$\theta$ counter 52 at any instant is a measure of the angular orientation of the aerial 16 with respect to true north.

The echo pulses, due to the ship B, at the output 42 of the AND gate 36 are arranged to operate a set of transfer gates 54 connected between the master-$r$ counter 48 and an accumulator 56, and a further set of transfer gates 58 connected between the master-$\theta$ counter 52 and an accumulator 60. These echo pulses are also applied to a counter 62. Thus, as the orientation of the aerial 16 approaches the direction along which the ship B lies, the input 40 of the AND gate 36 is energised: shortly after the production of each subsequent radar output signal and its corresponding sync. pulse, the input 38 of the AND gate 36 also becomes energised for a short period of time, thus opening the AND gate 36. One of these subsequent radar output signals will normally be reflected from the ship B, and the resulting echo pulse will occur within this short period of time, and will therefore pass through the AND gate 36. The resulting echo pulse at the output 42 of the AND gate 36 increases the count of the counter 62 by one, and operates the sets of transfer gates 54, 58 to transfer the respective counts in the master-$r$ counter 48 and master-$\theta$ counter 52 into the respective accumulators 56 and 60.

Where the ship B is relatively large, echo pulses may also result from, say, the three succeeding radar signals, before the input 40 of the AND gate 36 is de-energised. These echo pulses also operate the counter 62 and the transfer gates 54, 58, so that after the aerial 16 has completed its scan of the ship B, the accumulator 56 contains a digital number $R_B$ representative of the sum of four successively measured values of the distance from the ship A to the ship B, the accumulator 60 contains a digital number $\Theta_B$ representative of the sum of four successively measured values of the bearing of the ship B, and the counter 62 contains a count of 4. The respective numbers in the accumulators 56 and 60 are then transferred to respective digital divider circuits 64, 66, in which they are divided by the count in the coutnter 62 to produce respective digital number signals $r'_B$ and $\theta'_B$ which effectively represent the distance to and bearing of the "radar centre" of the ship B.

The master-$\theta$ counter 52 has a full-house output 67 at which it produces an output signal when it is full, i.e., once per revolution of the aerial 16. This output signal, representing $\theta = 0°$, coincides with a true north orientation of the aerial 16, and is arranged to reset the accumulators 56, 60 and the counter 62 to zero.

The digital signals $r'_B$ and $\theta'_B$ from the divider circuits 64, 66 pass to respective digital filters 68, 70, which filter them typically over five revolutions of the aerial 16, i.e., over a period of 15 seconds. It can be assumed that the courses of most ships likely to be tracked approximate a straight line over a short period such as 15 seconds, so the filters 68, 70 in the illustrated embodiment are simple linear filters which merely accumulate the values of $r'_B$ and $\theta'_B$ for five successive revolutions of the aerial 16, and then divide the accumulated totals by the number of individual values of $r'_B$ and $\theta'_B$ accumulated (this caters for the possibility of failing to detect the ship B during one or more of the five revolutions). The filters 68, 70 thus produce respective digital positional lsignals $r_B$ and $\theta_B$ which represent the distance to the bearing of the ship B at the midpoint of the 15 second period.

The positional signals $r_B$ and $\theta_B$ are in polar coordinates with respect to the ship A as origin. To enable them to be mathematically manipulated more simply, they are applied to polar co-ordinate to cartesian co-ordinate conversion circuit 72, which employs a cordic algorithm effectively to solve the equations $$x = r \cos \theta$$
$$y = r \sin \theta$$

This is a known technique, and is described for example in a paper by J.E. Volder entitled "The CORDIC Trigonometric Computing Technique" in I.R.E. Transactions on Electronic Computers, September 1959, pages 330 to 334. An efficient implementation of the technique is described in our copending United Kingdom Pat. application No. 8365/73 now British Pat. No. 1,331,410.

The conversion circuit 72 thus produces two cartesian positional signals $x'_B$ and $y'_B$ corresponding to $r_B$ and $\theta_B$, still with respect to the ship A as origin. These cartesian positional signals $x'_B$ and $y'_B$ are then applied to first inserts 7474a of respective adder circuits 74, which have second inputs 74b connected to respective outputs of an own ship's motion computer 76 forming part of the computing apparatus 10. The computer 76 receives as inputs signals representative of gyro compass reading, helm and engine RPM of the ship A, and derives from these inputs, in known manner, digital positional signals $x'_A$ and $y'_A$ representative of the position of the ship A in "north-up" cartesian co-ordinates with respect to an arbitrary fixed origin, and digital signals $\dot{x}_A$ and $\dot{y}_A$ representative of the speed of the ship A with respect to this origin in the x and y directions. It will be appreciated that in view of the inputs, this origin is fixed in relation to the sea, and may therefore move slightly in absolute terms in response to sea currents, tides, etc. Also, the position of this origin is shifted from time to time in dependence upon the distance travelled by the ship A, in order to limit the values of the co-ordinates, e.g., to the values necessary to cover an area of 100 miles by 100 miles.

The adder circuits 74 algebraically combine the signals $x_B$, $y_B$ with the signals $x'_A$, $y'_A$ to produce cartesian positional signals $x_B$ and $y_B$ representative of the position of the ship B with respect to the fixed origin.

Each of the digital signals (or "words") $x_B$ and $y_B$ may typically contain up to 16 bits, and they are transferred into respective x and y registers 78, 80 each capable of storing 20, 16-bit words. Typically, they are transferred into the registers 78, 80 by a physical right-shift as viewd in FIG. 1, so that the most recent values of $x_B$ and $y_B$ are entered in the left hand ends of the registers, while the oldest values are simultaneously shifted out of, ie., discarded from, the right hand ends: however, they may in practice be entered at any position in the registers 78, 80, if an address register (not shown) is simultaneously addressed to store the position, such an arrangement constituting a random access memory or RAM. Thus when full, the x and y registers 78, 80 each contain 20 stored digital signals, corresponding pairs of which are representative of the position of the ship B every 15 seconds for the preceding 5 minutes: the contents of the registers 78, 80 are updated every 15 seconds.

Figure 3A:
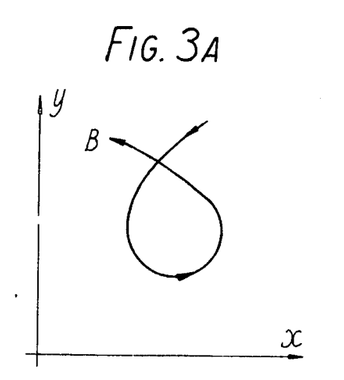
FIGS. 3A, 3B and 3C are explanatory diagrams which illustrate possible manoeuvres of a ship being tracked.
Figure 3B:
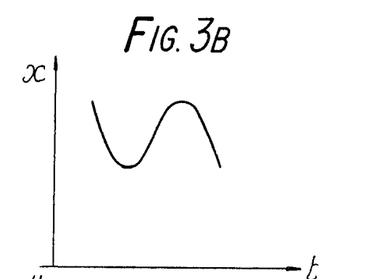
Figure 3C:
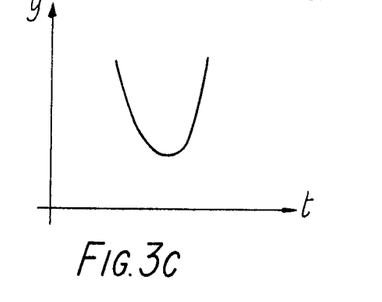

When considering the possible manoeuvres of a ship such as the ship B, it can be assumed in most cases that the ship will not execute any sudden or rapid changes of course or speed. Typically, a large super-tanker can turn at a rate of up to 30° per minute, while a relatively small, highly manoeuvrable frigate can turn at up to 200° per minute. Ships which are more manoeuverable than this latter example are unlikely to be met in open seas, and in any case their manoeuvrability would tend to render them capable of taking unilateral avoiding action. Assuming that the ship B is capable of the higher of the two rates of turn mentioned, it could, for example, over a period of say two minutes, execute the manoeuvre shown in cartesian co-ordinates in FIG. 3a. The variation of the cartesian co-ordinates x and y with time during this manoeuvre is shown in FIGS. 3b and 3c respectively. It can be seen that x varies in a cubic or third order manner, while y varies in a quadratic or second order manner. Thus it can be assumed that over a relatively short period of time such as two minutes, the track of any ship likely to be met can be quite accurately described by two hypothetical third order polynomial functions, $$x = f_1(t) \text{ and}$$
$$y = f_2(t)$$

It follows from this assumption that the values of $x_B$ and $y_B$ stored in the registers 78, 80 should satisfy, i.e., lie on the curves described by, two such third order polynomial functions. However, the values of $x_B$ and $y_B$ are inherently subject to random error, the magnitude of this error normally having a Gaussian distribution. The present invention uses digital filtering techniques to reduce the effect of this error.

Thus it can be shown that for a number N of sampled data points $X_1, X_2, X_3, \ldots, X_N$ spaced apart by equal intervals of time T, the value of the time derivative $d^m x/dt^m$ of the unique hypothetical $M^{th}$ order polynomial function which is a least squares fit with these data points is given by $d^m x/dt^m = a_0 X_1 + a_1 X_2 + a_2 X_3 + \ldots a_k X_{k+1} \ldots + a_{N-1} X_N, (0 \leq k \leq N-1)$, where the coefficients $a_0$ to $a_{N-1}$ are constant and uniquely determined by i. the number and the spacing of the data points;
ii. the position on the polynomial, i.e., the value of the independent variable $t$, at which the time derivative is required;
iii. the order of the polynomial (i.e., the value of $M$); and
iv. the particular derivative required. The coefficients $a_0$ to $a_{N-1}$ for time $t = (N-1+\alpha)T$, my be derived as follows: $a_k = \mu_1 + \mu_2 k + \mu_3 k^2 + \ldots + \mu_{M+1} k^M$, where the coefficients $\mu_1 \ldots \mu_{M+1}$ are obtained by solving the set of $(M+1)$ simultaneous equations $$\mu_1 \sigma_1 + \mu_2 \sigma_2 + \ldots + \mu_{M+1} \sigma_{M+1} = A(1,m)$$
$$\mu_1 \sigma_2 + \mu_2 \sigma_2 + \ldots + \mu_{M+1} \sigma_{M+2} = A(2,m)$$
·
·
·
$$\mu_1 \sigma_{M+1} + \mu_2 \sigma_{M+2} + \ldots \mu_{M+1} \sigma_{2M+1} = A(M+1, m)$$

and $$\sigma_j = \sum_{k=0}^{k=N-1} k^{j-1},$$

while the terms $A(1,m), A(2,m), \ldots$ for different values of $m$ are given by:

| $m =$ | 0 | 1 | 2 | 3 |
|---|---|---|---|---|
| $A(1,m)$ | 1 | 0 | 0 | 0 |
| $A(2,m)$ | $-\alpha$ | $-1/T$ | 0 | 0 |
| $A(3,m)$ | $\alpha^2$ | $2\alpha/T$ | $2/T^2$ | 0 |
| $A(4,m)$ | $-\alpha^3$ | $-3\alpha^2/T$ | $-6\alpha/T^2$ | $-6/T^3$ |

Examples of the values of the terms $\sigma_j$ for different values of $j$ are:

$j \quad \sigma_j$
1   $N$
2   $N(N-1)/2$
3   $N(N-1)(2N-1)/6$
4   $N^2(N-1)^2/4$
5   $N(N-1)(2N-1)(3N^2-3N-1)/30$
6   $N^2(N-1)(2N^3-4N^2+N+1)/12$
7   $N(N-1)(6N^5-15N^4+6N^3+6N^2-N-1)/42$ Thus under good radar conditions, e.g., fine weather, relatively calm seas, when the random error in the input positional signals from the radar apparatus 12 is relatively small, typically the eight most recent values of the signals $x_B$, $y_B$ are applied sequentially to respective digital filter systems 82, 84. Each of the filter systems 82, 84 comprises a digital multiplier 86, a coefficient store 88 and a summing circuit 89. The store 88 is preferably implemented as an integrated circuit read only memory or ROM, and has two sets of eight coefficients, predetermined as hereinbefore described, stored therein in digital form. As each of the signals $x_B$ is applied to its filter system 82, it is multiplied in the multiplier 86 by a respective coefficient from the first set, the products thus formed being summed in the summing circuit 89 so as to produce a digital signal representative of the value of the first derivative $\dot{x}_r$ of the unique third order polynomial function which is a least squares fit with the signals $x_B$, at a time in the region of that represented by the most recent stored signal $x_B$. Each of the signals $x_B$ is also multiplied in the multiplier 86 by a respective coefficient from the second set, the products thus formed being summed in the summing circuit 89 so as to produce a further digital signal representative of the first derivative $\dot{x}_m$ of this polynomial function, at a time lying substantially in the middle of the interval between the respective times represented by the most recent and the oldest stored signals $x_B$. In an exactly analagous manner, digital signals representative of first derivatives $\dot{y}_r$ and $\dot{y}_m$ are derived from the signals $y_B$ in the filter system 84.

Under poor radar conditions, e.g., bad weather, rough seas, the filter systems 82, 84 are effectively expanded so that each typically receives the 15 most recent values of the signals $y_B$, $y_B$. These signals are similarly multiplied by respective coefficients from four further sets of coefficients, each of which sets is made up of 15 coefficients and is also stored in the coefficient stores 88, to produce signals $\dot{x}_r$, $\dot{x}_m$, $\dot{y}_r$ and $\dot{y}_m$ as hereinbefore described.

The reason for generating the signals $\dot{x}_m$ and $\dot{y}_m$ in addition to the signals $\dot{x}_r$ and $\dot{y}_r$ lies in the fact that the respective polynomial functions approximate the values of $x_B$ and $y_B$ most closely in the region of the temporally middle ones of these values, the approximation becoming progressively less accurate for the more recent ones. Thus the absolute magnitude of $\dot{x}_m$ and $\dot{y}_m$ is more accurate than the absolute magnitude of $\dot{x}_r$ and $\dot{y}_r$, although the accuracy of the ratio of $\dot{x}_r$ to $\dot{y}_r$ is still quite good even at the time represented by the most recent values of $x_B$ and $y_B$.

The signals $\dot{x}_m$ and $\dot{y}_m$ are then applied to a squaring, adding and square root circuit 90 which produces an output digital signal $v_B = \sqrt{\dot{x}_m^2 + \dot{y}_m^2}$, while the signals $\dot{x}_r$ and $\dot{y}_r$ are applied to a tangent circuit 92, again employing a cordic algorithm, which produces an output digital signal $\alpha_B = \tan^{-1} \dot{y}_r/\dot{x}_r$. The signal $v_B$ thus represents the speed of the ship B in the middle of the preceding 2 minute period, while the signal $\alpha_B$ represents the course of the ship B at the end of this two minute period, i.e., about 15 seconds before the production of the signal $\alpha_B$. The signals $v_B$ and $\alpha_B$ are supplied to a suitable digital decoder 94, the output of which can be used to drive an alpha-numeric display or a printer as desired.

The signals $\dot{x}_r$ and $\dot{y}_r$ are also applied to the circuit 90 to produce a digital output signal $v_{Br} = \sqrt{\dot{x}_r^2 + \dot{y}_r^2}$, which is combined with the signal $v_B$ in a divider 95 to form a ratio signal $k = v_B/v_{Br}$. This ratio signal is applied as a correction factor to the signals $\dot{x}_r$ and $\dot{y}_r$ in respective multipliers 97 to form signals $k\dot{x}_r$, $k\dot{y}_r$ respectively, thus correcting for the aforementioned inaccuracy in the absolute magnitudes of $\dot{x}_r$ and $\dot{y}_r$.

The corrected signals $k\dot{x}_r$ and $k\dot{y}_r$ are applied to an adder circuit 96, in which they are algebraically combined with the signals $\dot{x}_A$ and $\dot{y}_A$ from the computer 76 to produce signals $\dot{x}'_B$ and $\dot{y}'_B$ representative of the speed of the ship B in the x and y directions with respect to the ship A. Similarly, the most recent signals $x_B$ and $y_B$ from the registers 78, 80 are applied to an adder circuit 98, in which they are algebraically combined with the signals $x'_A$ and $y'_A$ from the computer 76 to produce signals $x''_B$ and $y''_B$ representative of the position of the ship B with respect to the ship A as origin. The pairs of signals $\dot{x}'_B$, $\dot{y}'_B$ and $x''_B$, $y''_B$ are then applied to respective cartesian co-ordinate to polar co-ordinate conversion circuits 100, 102, which each employ a respective cordic algorithm to transform the signals into the polar co-ordinate form $\dot{r}_B$, $\theta_B$ and $r''_B$, $\theta''_B$. An increment circuit 104, connected to receive the full-house signal from the output 67 of the master $\theta$ counter 52, is arranged to receive the signals $\dot{r}_B$ and $r''_B$, and to increment $r''_B$ in proportion to $\dot{r}_B$ once per revolution of the radar aerial 16, so as to produce an output signal $r'''_B$ which is applied to a digital comparator 106. A correspondingly arranged increment circuit 108 similarly increments $\theta''_B$ in proportion to $\theta_B$, so as to produce an output signal $\theta'''_B$ which is applied to a further digital comparator 110.

The comparator 106 also receives as inputs the count in master-$r$ counter 48, and a digital signal $\delta r$ which is adjustable to represent the maximum anticipated range of error in the radar-measured value of $r$, and produces at its output the previously mentioned energising signal for the input 38 of the AND gate 36 only when the count in the master-$r$ counter 48 lies between $r''_B - \delta r/2$ and $r''_B + \delta r/2$. The signal $\delta r$ is also applied to a divider circuit 112, in which it is divided by the signal $r''_B$ from the conversion circuit 100 to produce a digital output signal $\delta\theta$. The signal $\delta\theta$ and the count in the master-$\theta$ counter 52 are applied to the comparator 110, which produces at its output the previously mentioned energising signal for the input 40 of the AND gate 36 only when the count in the master-$\theta$ counter 52 lies between $\theta''_B - \delta\theta/2$ and $\theta''_B + \delta\theta/2$.

The digital signals $x_B$ and $y_B$ are scanned sequentially by respective digital to analogue converters 114, 116, whose outputs are smoothed by respective integrating amplifiers 118, 120. The smoothed outputs from the integrating amplifiers 118, 120, after further amplification in respective display drivers 121, are employed to drive the x and y plates of a cathode ray tube display 122, which thus displays the track of the ship B over the preceding 5 minutes: the track is preferably displayed as a continuous line, as shown at 123. The signals $k\dot{x}_r$ and $k\dot{y}_r$ are also applied to respective digital-to-analogue converters 124, 126 whose outputs comprise respective D.C. signals proportional to the magnitude of $k\dot{x}_r$ and $k\dot{y}_r$. These D.C. signals are applied to linear integrators 128, 130 respectively for a fixed time, so that the integrators produce ramp outputs which are also arranged to drive the display 122 via the display driver 121. The display driver 121 is arranged to cause the display based upon $k\dot{x}_r$ and $k\dot{y}_r$ to continue as a dotted line from the point where the continuous line display ended, as shown at 131, thus producing a line whose length is proportional to the speed of the ship B and which extends in the direction of travel, i.e., along the calculated course, of the ship B.

The signals $x_A$ and $y_A$ produced by the computer 76 during the preceding five minutes are also stored in registers (not shown) identical to the registers 78, 80, and these stored signals and the signals $\dot{x}_A$ and $\dot{y}_A$ are processed and displayed on the display 122 as described in the preceding paragraph: this display of the past and predicted tracks of the ship A is shown at 123a and 131a, and is preferably of increased brightness, to distinguish it clearly from the display relating to the ship B. The computer 76 is further provided with manually controllable switching means 132, whereby trial inputs representative of trial changes of the helm (course) and engine RPM (speed) of the ship A may be inserted and the predicted result of these changes may be displayed as the track 131a on the display 122: the computer 76 takes into account the dynamics of the ship A, e.g. its rate of response to changes of helm or engine RPM.

Finally the most recent signals $x_B$, $y_B$, $k\dot{x}_r$, $k\dot{y}_r$, are supplied, together with the most recent signals $x_A$, $y_A$, $\dot{x}_A$ and $\dot{y}_A$, to a central processor 134, which computes successive future positions $x_{A1}$, $y_{A1}$, ... $x_{Aj}$, $y_{Aj}$ of the ship A and $x_{B1}$, $y_{B1}$, ... $x_{Bj}$, $y_{Bj}$ of the ship B at say 30 second intervals, and derives an output signal $d = (x_{Ai} - x_{Bi})^2 + (y_{Ai} - y_{Bi})^2$ for each corresponding pair of positions, until the smallest value of $d$, i.e., $d_{CA}$, the distance of closest approach of the ship B to the ship A, is found. The processor 134 then produces output signals representative of the distance $d_{CA}$ and time $t_{CA}$ of closest approach. The signals $t_{CA}$ and $d_{CA}$ are decoded in a decoder 136, the output of which is used to drive the aforementioned alphanumeric display or printer. Additionally, the signal $d_{ca}$ is applied to a digital comparator 138, which is arranged to trigger a visible and/or audible alarm 140 when the computed distance of closest approach falls below a predetermined distance, e.g., 0.5 miles.

The computing apparatus 10 has been described in discrete circuit block form to facilitate clear understanding of its mode of operation: however, in practice some or all of the circuits 64, 66, 68, 70, 72, 74, 82, 84, 90, 92, 96, 98, 100, 102, 104, 108 and 112 need not exist as discrete circuits, but may be implemented by suitably programming the operation of multiplying, dividing, adding and subtracting units forming the central processor 134. In this case, FIG. 1 can be regarded as a flow diagram rather than a block diagram.

Moreover, in practice it will be desirable to track more than one other ship. Typically, it may be required to track up to 100 other ships, and this can be achieved by providing one tracking channel, i.e., one each of at least the registers 78, 80, for each target, and by time sharing the operation of some of the other circuits. For example, there could be provided three sequentially operable AND gates 36 and their associated comparators 106, 110, each ANd gate being assigned to about 30 ships each in a different sector around the ship A. Likewise, the accumulator 56, if reset shortly after the closure of the AND gate 36, could be operated on a similar time-sharing basis to that outlined for the AND gates 36.

It can be arranged that, if a particular target being tracked is not detected during a particular group of five revolutions of the aerial 16, its last detected position is updated by the circuits 104, 108 to produce an estimated value for the undetected position, which estimated value is inserted at the appropriate time into the converter 72 in place of the undetected (i.e. missing) actual value. In this case, it would also be arranged to operate an alarm if the target was not detected again within a predetermined small number of subsequent revolutions of the aerial 16.

In practice, the radar transmitter/receiver 14 frequently detects spurious echoes, e.g., caused by reflections from large waves, particularly when the gain thereof is adjusted near to its maximum value. The computing apparatus 10 of the present invention can be readily modified to exploit this phenomenon to advantage. Thus when an echo is first detected, it is assigned in the normal manner to the first available tracking channel, or to one of several specially allocated tracking channels, and one of the gates 36 open during the subsequent few revolutions of the aerial 16 to define a radar window in the region from which the echo appeared to emanate. The region from which the echo emanated is also stored in one of, say, 24 registers, which represent four 90° segments of the aerial scan and six range bands (e.g., 0–2 miles, 2–4 miles, etc.). If the echo is spurious, it will not be consistently detected during the subsequent few revolutions of the aerial 16. The absence of a subsequent echo pulse emanating from the radar window is therefore arranged to operate a bistable device (not shown) associated with the tracking channel, to indicate the presence of a spurious echo, i.e., an echo which the tracking channel cannot lock on to and track. Spurious echo counters (not shown) are connected to these bistable devices, and are arranged to count the number of spurious echoes emanating from each of the 24 regions in a predetermined interval. A digital comparator (not shown), connected to the counters, increases the gain of the A.G.C. circuit 24 whenever the rate of spurious echo occurrence falls below a predetermined level, and decreases the gain of the circuit 24 whenever this rate rises above the predetermined level, on a region-by-region basis. The combined gain of the radar transmitter/receiver 14 and the circuit 24 is thus maintained at an optimum level as defined by the predetermined rate of the spurious echo occurrence for each region.

If desired, the computing apparatus 10 can be modified to control the course and/or speed of the ship A to avoid collisions. Thus whenever the value of the signal $d_{CA}$ falls below a predetermined limit, the computing apparatus 10 can be arranged to automatically and sequentially apply the aforementioned trial inputs to the computer 76 via the switching means 132. Typically, these inputs could sequentially represent 5° change to port, 5° change to starboard, 10° change to port, 10° change to starboard, and so on. Each time a trial input is applied, the value of $d_{CA}$ for the ship which initiated the process, and other ships in the region of this ship, is computed, until a safe value which lies outside the predetermined limits is found. The computing apparatus 10 then produces an output signal proportional to the trial input which resulted in the safe value of $d_{CA}$, and this output signal effects the appropriate change of helm of the ship A via suitable power amplifiers and servo motors.

Although the invention has been described with reference to its use, in conjunction with marine radar apparatus, for tracking ships, it will be appreciated that it could be readily modified for other uses. For example, it could be modified to accept input signals from airborne radar apparatus, which signals can contain range, azimuth and elevational information, and thus be indicative of the position of another aircraft in three dimensions. Moreover, it could be modified to accept two or three dimensional positional signals derived from sonar apparatus. In fact, in this specification the expression "input positional signals" is intended to include any detectable signals which emanate from an object, e.g., by reflection or emission therefrom, and from which the position of the object can be deduced. Furthermore, it is possible to use approximations other than a least squares fit, and the hypothetical function to which the positional signals are fitted can be other than a third order polynomial function, for example a second order polynomial function or, particularly for tracking moving objects such as hovercraft (which can change their direction of movement relatively abruptly), a general or linear spline function.

What is claimed is:

1. Computing apparatus for tracking moving objects, the apparatus comprising:
    input circuit means for receiving temporally-spaced input positional signals each of which is indicative of a position of at least one moving object and may be subject to error;
    means for producing from said input signals a plurality of temporally-spaced pairs of digital positional signals $x$, $y$, each of which pairs of signals is representative in cartesian co-ordinate form of a position of said at least one object;
    digital signal storage means connected to receive said pairs of signals and arranged to store a predetermined number of the most recently produced thereof;
    digital filter means arranged to receive the stored signals, said digital filter means including digital multiplier means for multiplying each of said stored signals $x$ by a respective one of a first set of predetermined coefficients and each of said stored signals $y$ by a respective one of a second set of predetermined coefficients, and means for summing the products of $x$ thus formed and for summing the products of $y$ thus formed, so as to produce respective digital signals representative of the time derivatives $d^m x/dt^m$ and $d^m y/dt^m$ ($m = 0, 1, 2, \ldots$) at at least one preselected common point in time on respective hypothetical functions $x = f_1(t)$ and $y = f_2(t)$ which substantially fit the values represented by $x$ and $y$, both of said hypothetical functions being selected from the group of functions comprising polynomial functions of at least the second order and spline functions;
    and means for producing output signals which are dependent upon said time derivative digital signals.

2. Computing apparatus as claimed in claim 1, wherein said predetermined coefficients are selected on the basis that said hypothetical functions are both third order polynomial functions.

3. Computing apparatus as claimed in claim 1, wherein said predetermined coefficients are selected on the basis that said hypothetical functions are both a least squares fit with the values represented by $x$ and $y$.

4. Computing apparatus as claimed in claim 1, wherein the digital signals produced by said digital filter means are representative of the first time derivaties $dx/dt$ and $dy/dt$.

5. Computing apparatus as claimed in claim 4, wherein the preselelcted common point in time is in the region of the time represented by the most recent stored pair of signals, and the multiplying means is further arranged to multiply each of said stored signals $x$ by a respective one of a third set of predetermined coefficients and each of said stored signals $y$ by a respective one of a fourth set of predetermined coefficients, and the summing means is arranged to sum the products of $x$ thus formed and to sum the products of $y$ thus formed, so as to produce further time derivative digital signals respectively representative of the time derivatives $(dx/dt)_{mid}$ and $(dy/dt)_{mid}$ at a second preselected common point in time on said hypothetical functions, said second preselected common point in time lying nearer to the middle of the time interval between the respective times represented by the most recent and the oldest stored pairs of signals, the output signal producing means being arranged to produce said output signals in dependence upon both the firstmentioned time derivative digital signals and the further time derivative digital signals.

6. Computing apparatus as claimed in claim 1, wherein the digital filter means includes further storage means for storing said predetermined coefficients.

7. Computing apparatus as claimed in claim 6, wherein the further storage means comprises a read only memory (ROM).

8. Computing apparatus as claimed in claim 1, wherein the first-mentioned storage means comprises a random access memory (RAM).

9. Computing apparatus as claimed in claim 1, wherein the input circuit is adapted to receive said input positional signals in polar co-ordinate form.

10. Computing apparatus as claimed in claim 9, wherein the means for producing said pairs of positional signals includes cordic polar co-ordinate to cartesian co-ordinate conversion means.

11. Computing apparatus as claimed in claim 9, wherein the input circuit means includes gating means connected to receive the input positional signals, and enabling means for enabling the gating means to transmit those input positional signals indicative of an object whose range and bearing fall within respective predetermined ranges of values.

12. Computing apparatus as claimed in claim 11, wherein there is provided control means connected between the digital filter means and the enabling means, the control means being arranged to adjust the respective predetermined ranges over which the enabling means is operative in accordance with said time derivative digital signals, whereby the area defined by said predetermined ranges of values moves in substantially the same direction and at substantially the same speed as said at least one object.

13. Computing apparatus as claimed in claim 12, wherein the control means includes at least one cordic cartesian co-ordinate to polar co-ordinate conversion means.

14. Computing apparatus as claimed in claim 1, said apparatus being adapted for use with radar or sonar apparatus carried by a moving vehicle such as a ship, and including means for receiving input signals indicative of the speed and direction of movement of the vehicle, and calculating means for calculating from these input signals the position of the vehicle with respect to a substantially stationary origin at predetermined intervals of time, and for producing signals representative in cartesian co-ordinate form of these calculated positions.

15. Computing apparatus as claimed in claim 14, wherein the means for producing said pairs of digital positional signals is connected to receive said calculated position signals and arranged to combine them with said input positional signals, whereby said digital positional signals are representative of positions with respect to said substantially stationary origin.

16. Computing apparatus as claimed in claim 14, wherein the means for receiving the input signals indicative of the speed and direction of movement of the vehicle include switching means whereby trial input signals indicative of trial speeds and/or directions may be manually selected.

17. Computing apparatus as claimed in claim 14, wherein the calculating means is additionally arranged to calculate from its input signals the speed of the vehicle in the $x$ and $y$ directions with respect to said substantially stationary origin and to produce further signals representative of these speeds.

18. Computing apparatus as claimed in claim 17, wherein there is provided further calculating means, which is connected to receive the firstmentioned and further signals produced by the firstmentioned calculating means, and which is arranged to calculate linearly the respective predicted future tracks of the vehicle from said firstmentioned and further signals.

19. Computing apparatus as claimed in claim 18, wherein the further calculating means is additionally connected to receive the most recent stored pair of positional signals from the storage means and the output signals from the output signal producing means, and is arranged to calculate linearly the predicted future track of the object from said positional signals and said output signals.

20. Computing apparatus as claimed in claim 19, wherein the further calculating means is also adapted to calculate the time and/or distance of closest approach of the object to the vehicle as the latter moves along any one of said predicted future tracks.

21. Computing apparatus as claimed in claim 20, wherein there is provided alarm means for operating a visible and/or audible alarm if the time and/or distance of closest approach falls below a predetermined value.

22. Computing apparatus as claimed in claim 14, wherein there is provided means for storing a predetermined number of the most recent calculated position signals.

23. Computing apparatus as claimed in claim 1, wherein there is provided display means, and first signal forming means connected to receive said stored digital signals and arranged to produce a first display signal for causing said display means to display the past track of said at least one object.

24. Computing apparatus as claimed in claim 23, wherein the first signal forming means comprises a digital-to-analogue converter connected to sequentially scan the stored digital signals, so as to produce an analogue output which varies with the values of the stored digital signals, and smoothing means for smoothing said analogue output to produce said display signal.

25. Computing apparatus as claimed in claim 23, wherein there is provided second signal forming means connected to said digital filter means and arranged to produce a second display signal for causing said display means to display a predicted future track of said at least one object, the direction and length of said predicted track being determined in dependence on said time derivative digital signals.

26. Computing apparatus as claimed in claim 22, wherein there is provided third signal forming means, which is connected to receive the stored calculated position signals and arranged to produce a third display signal for causing said display means to display the past track of the vehicle.

27. Computing apparatus as claimed in claim 19, wherein there is provided fourth signal forming means connected to said further calculating means and arranged to produce a fourth display signal for causing the display means to display any one of said predicted future tracks of the vehicle.

28. Computing apparatus for tracking moving objects, the apparatus comprising:
input circuit means for receiving temporally spaced input positional signals each of which is indicative of a position of at least one moving object and may be subject to error;
means for producing from said input signals a plurality of temporally spaced pairs of digital positional signals $x$, $y$, each of which pairs of signals is representative in cartesian co-ordinate form of a position of said at least one object;
digital signal storage means connected to receive said pairs of signals and arranged to store a predetermined number of the most recently produced thereof;
digital filter means arranged to receive the stored signals;
said digital filter means including digital multiplier means for multiplying each of said stored signals $x$ by a respective one of a first set of predetermined coefficients and each of said stored signals $y$ by a respective one of a second set of predetermined coefficients, and means for summing the products of $x$ thus formed and for summing the products of $y$ thus formed, so as to produce first and second digital signals respectively representative of the time derivatives $\dot{x}_r$ and $\dot{y}_r$ at at least one preselected common point in time on respective hypothetical functions $x = f_1(t)$ and $y = f_2(t)$ which substantially fit the values represented by $x$ and $y$, both of said hypothetical functions being selected from the group of functions comprising polynomial functions of at least the second order and spline functions, said preselected common point in time being in the region of the time represented by the most recent stored pair of signals;

said multiplier means being further arranged to multiply each of said stored signals $x$ by a respective one of a third set of predetermined coefficients and each of said stored signals $y$ by a respective one of a fourth set of predetermined coefficients, and the summing means is arranged to sum the products of $x$ thus formed and to sum the products of $y$ thus formed, so as to produce third and forth time derivatives digital signals respectively representative of the time derivatives $\dot{x}_m$ and $\dot{y}_m$ at a second preselected common point in time on said hypothetical functions, said second preselected common point in time lying nearer to the middle of the time interval between the respective times represented by the most recent and the oldest stored pair of signals;

tangent circuit means for producing digital output signals in the form $\alpha_B = \tan^{-1} \dot{y}_r/\dot{x}_r$ representative of the course of said object at said first, recent, preselected common point in time;

and squaring, adding and square rooting circuit means for producing digital output signals in the form $$v_B = \sqrt{\dot{x}_m^2 + \dot{y}_m^2}$$

representative of the speed of said object at said second preselected common point in time lying nearer to the middle of the time interval between the respective times represented by the most recent and the oldest stored pairs of signals.

* * * * *

UNITED STATES PATENT OFFICE
CERTIFICATE OF CORRECTION

Patent No. 3,869,601      Dated March 4, 1975

Inventor(s) Eric Metcalf      Page 1 of 2

It is certified that error appears in the above-identified patent and that said Letters Patent are hereby corrected as shown below:

Column 1, line 38 after "speed" insert -- of one --.

Column 3, line 4 after "e.g." insert -- one thousandth --.

line 45, after "to" delete "the" and substitute therefor -- and --.

Column 5, line 22 after "first" delete "inserts" and substitute therefor -- inputs --.

line 44 delete "$X_B$ , $Y_B$" and substitute therefor -- $X_B$ , $Y'_B$ --.

Column 6, line 49, after "T" delete "my" and substitute therefor -- may --.

Column 7, line 52 after "signals" delete "$Y_B$ , $Y_B$" and substitute therefor -- $X_B$ , $Y_B$ --.

UNITED STATES PATENT OFFICE
CERTIFICATE OF CORRECTION

Patent No. 3,869,601     Dated March 4, 1975

Inventor(s) Eric Metcalf     Page 2 of 2

It is certified that error appears in the above-identified patent and that said Letters Patent are hereby corrected as shown below:

Column 10, line 9 after "each" delete "ANd" and substitute therefor -- AND --.

Signed and Sealed this

Twenty-third Day of May 1978

[SEAL]

Attest:

RUTH C. MASON
Attesting Officer

LUTRELLE F. PARKER
Acting Commissioner of Patents and Trademarks